T. HANVEY.
Manufacture of Wooden Barrel.
No. 211,628. Patented Jan. 28, 1879.
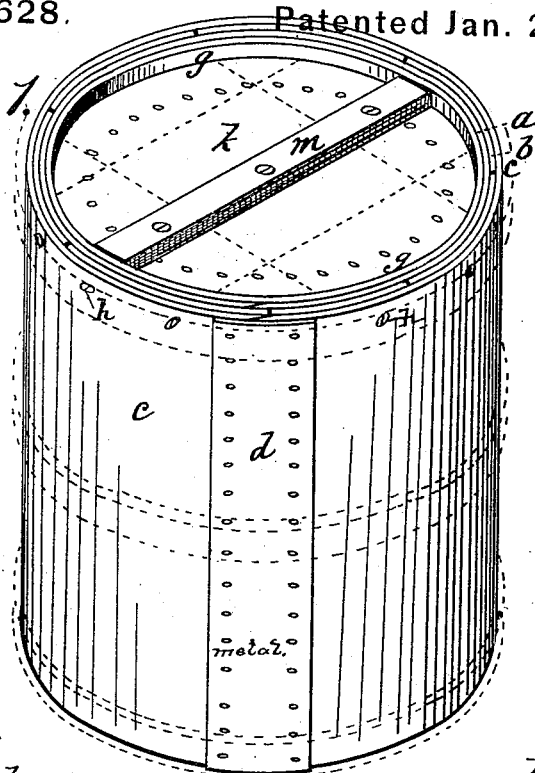
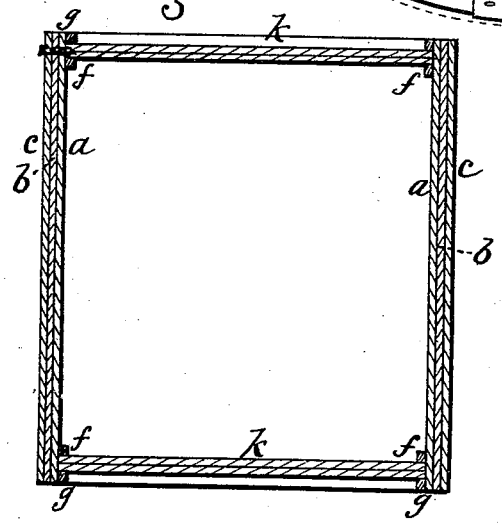
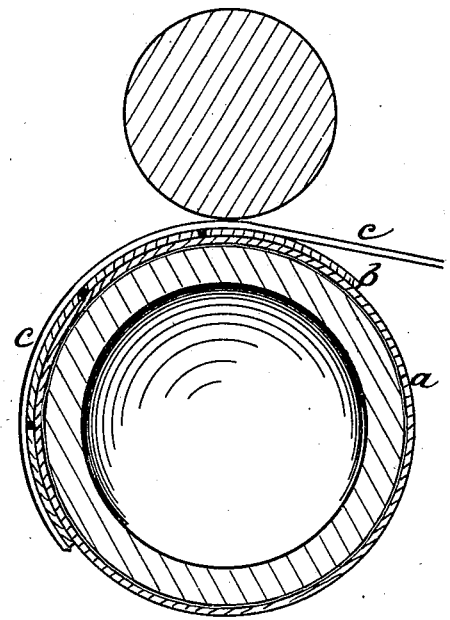
Witnesses.
Edwin B. Scott
Louis Spahn
Inventor.
Thos Hanvey
pr R F Osgood
atty.

UNITED STATES PATENT OFFICE.

THOMAS HANVEY, OF ROCHESTER, NEW YORK.

IMPROVEMENT IN THE MANUFACTURE OF WOODEN BARRELS.

Specification forming part of Letters Patent No. 211,628, dated January 28, 1879; application filed October 24, 1874.

*To all whom it may concern:*

Be it known that I, THOMAS HANVEY, of the city of Rochester, in the county of Monroe and State of New York, have invented a certain new and useful Improvement in Barrels and similar packages; and I do hereby declare that the following is a full, clear, and exact description of the construction and operation of the same, reference being had to the accompanying drawings, in which—

Figure 1 is a perspective view. Fig. 2 is a vertical section. Fig. 3 is a cross-section of the mandrel and pressing-roller, showing the method of manufacture.

My improvement relates to that class of barrels made by winding thin layers or veneers of wood around a mandrel or form and nailing the edges together.

The invention consists in the method or process, hereinafter described of forming the barrel, whereby, after the first layer is wound, the succeeding layers are wound or laid at one operation, thereby preventing the cooling of the cement between the layers before the operation is completed, also preventing springing of the edges of the intermediate layer, and, furthermore, producing tighter and better work.

I form the stuff in thin layers by boiling the log and running it through a cutting-machine, which leaves the pieces in condition to then be wound upon the mandrel.

I first wind upon the mandrel the layer *a*, which forms the inner surface of the barrel, and secure the overlapping edges by nailing. I then apply outside this layer *a* heavy coat of glue or other suitable cement, and then lay thereon the longitudinal strips *b b*, which form the middle layer. These, in addition to being glued or cemented, are nailed at intervals to make the barrel stronger. The first strip, *b*, being laid, the outer horizontal covering, *c*, is started and wound thereon beneath the pressing-roller as fast as the intermediate lining is laid in advance, as shown in Fig. 3. Glue is also applied between these layers to make a solid body. The lapping edges of the outer layer are nailed, and the joint is covered by a metallic strap, *d*, which extends from end to end, and is also nailed in place, as shown in Fig. 1.

Any number of the layers may be used in building up the barrel; but an odd number must be employed, in order to inclose the longitudinal layers, and leave the circumferential ones outside and inside.

The particular advantage this construction presents is, that the longitudinal layer or layers are inclosed and covered on both sides, so that they cannot spring or warp out of place, but are bound at the edges as well as at the center. The circumferential layers, extending all the way around, cover all the joints of the longitudinal layer, thereby binding the intermediate pieces in place, and always presenting a smooth and unbroken surface outside and inside. The grain of the several layers crossing each other prevents cracking or splitting, and the glue or cement unites the whole in one integral body.

For tight work I can conceive no method so effective as this, for if the layers all extend in one direction, with the grain running the same way, the barrel will split, and if the longitudinal lining is exposed on the inside of the barrel without covering, it will warp and separate at the joints and cannot be kept in place.

The heads *k k* of the barrel are made of two or more separate layers, which cross each other at right angles, as indicated by the dotted lines, Fig. 1, and are cemented or nailed together, thus counteracting any tendency to warp or twist, and preserving a true circle. They rest at their inner side on hoops *f f*, and are held on the outside by head-linings *g g*. These are nailed fast and glued in place to the sides of the barrel, and screws *h h* are then passed through the sides of the barrel and into the head to strengthen it.

The heads are also provided with cross-cleats *m m*, which come flush with the ends of the chines and give additional strength, being screwed to the heads.

I also intend to use exterior hoops (shown by dotted lines, Fig. 1) at the ends and in the middle of the barrel, to give additional strength and to cover the joints between the sections of the outer layer.

Having thus described my invention, what I claim as new is—

The herein-described process of forming barrels, which consists in first winding a circumferential layer upon a mandrel or form, then winding succeeding longitudinal and circumferential layers at one operation, closely following each other, the whole being built up in cement laid between the layers in the act of forming, as herein shown and described, and for the purpose specified.

In witness whereof I have hereunto signed my name in the presence of two subscribing witnesses.

THOS. HANVEY.

Witnesses:
 R. F. OSGOOD,
 EDWIN B. SCOTT.